United States Patent Office.

WILLIAM WEBER, OF CINCINNATI, OHIO.

Letters Patent No. 91,886, dated June 29, 1869.

IMPROVED MEDICAL COMPOUND.

The Schedule referred to in these Letters Patent and making part of the same.

*To all whom it may concern:*

Be it known that I, WILLIAM WEBER, of Cincinnati, in the county of Hamilton, and State of Ohio, have invented a new and useful Medical Compound; and I do hereby declare the following to be a full and correct description of the same, sufficient to enable others skilled in that class to which my invention appertains, to fully understand and compound the same.

The nature of my invention consists in the adaptation of the volatile oil of celery to the compounding of an essence of celery, which is to be used as medicine or stimulant.

I take one ounce of the volatile oil of celery, (manufactured in and imported from Europe,) and mix the same in a mortar, with a sufficient quantity of *magnesia alba* to produce a moist powder.

This powder is mixed with such an amount of ninety-four and a half per cent. alcohol, devoid of empyreumatic oil, as to produce, after filtering, one pint of fluid.

This fluid is then the essence of celery, with which the cordial and bitters are produced.

For the cordial, I take five pints of ninety per cent. alcohol, devoid of empyreumatic oil, and thoroughly mix it with a pint and a half of sirup, from the finest quality of sugar, and from three to four pints of water. To this mixture, I add so much of the essence of celery, above described, as will suit the taste of the person using it. The liquor or cordial thus obtained is an agreeable drink, and very healthy.

To produce the bitters for medical purposes, make a mixture of one ounce of agaricus, one pint of forty-five per cent. alcohol, and sufficient quantity of solution of indigo and tincture of *Flora calendulæ* to give a coloring, and add to this mixture sufficient essence of celery to produce a strong flavor of the same.

This bitters I have found to be an excellent remedy for diseases of the kidneys, the bladder, liver, and spleen, as well as dyspepsia, dropsy, and sexual debility, the medical qualities of the celery being augmented by the compound.

Having thus described my invention,

What I claim as new, and desire to secure by Letters Patent, is—

1. The essence of celery, when compounded of the ingredients and in the proportions substantially as described.

2. The celery-cordial, when compounded of the ingredients and in the proportions substantially as described.

3. The celery-bitters, when compounded of the ingredients and in the proportions substantially as described.

WILL. WEBER.

Witnesses:
JOHN P. BENSON,
T. VAN KANNEL.